United States Patent [19]

Brajder et al.

[11] 4,446,550

[45] May 1, 1984

[54] RELIABLE SIGNAL SYSTEM HAVING AT LEAST ONE TRANSMITTER FEEDING PLURAL SERIES-CONNECTED RECEIVER INPUTS

[75] Inventors: Antonio Brajder; Christian Kublick, both of Erlangen, Fed. Rep. of Germany

[73] Assignee: Siemens Aktiengesellschaft, Berlin and Munich, Fed. Rep. of Germany

[21] Appl. No.: 400,988

[22] Filed: Jul. 23, 1982

Related U.S. Application Data

[63] Continuation of Ser. No. 154,839, May 30, 1980.

[30] Foreign Application Priority Data

Jun. 7, 1979 [DE] Fed. Rep. of Germany ....... 2923156

[51] Int. Cl.³ .............................................. H04B 3/00
[52] U.S. Cl. ...................................... 370/14; 307/36; 340/641; 370/16
[58] Field of Search .......................... 370/14, 15, 16; 340/641, 642, 870.41, 825.01, 825.05, 825.98; 307/30, 36, 37, 38, 42

[56] References Cited

U.S. PATENT DOCUMENTS 2,461,962  2/1949  Carlson .............................. 340/642

Primary Examiner—Joseph A. Orsino, Jr.
Attorney, Agent, or Firm—Kenyon & Kenyon

[57] ABSTRACT

A signalling apparatus has at least one transmitter in a transmitter assembly for transmitting a signal by impressed current to several spatially separated receivers. A series circuit of threshold members is connected to the output terminals of each transmitter, the number of members corresponding to the number of receivers. The input of each receiver is connected to a threshold member; the receivers are therefore connected in series on the input side. It is ensured thereby that the same current flows through all receivers. In the event of a failure of a transmission line or a receiver, the current continues to flow through the associated threshold member so that signal transmission to the other receivers continues uninterrupted.

30 Claims, 3 Drawing Figures

RELIABLE SIGNAL SYSTEM HAVING AT LEAST ONE TRANSMITTER FEEDING PLURAL SERIES-CONNECTED RECEIVER INPUTS

This is a continuation, of application Ser. No. 154,839 filed May 30, 1980.

BACKGROUND OF THE INVENTION

This invention relates to a reliable signalling apparatus in which a transmitter assembly having at least one transmitter impresses a signal current on the series connected inputs of several receivers in physically (spatially) separated receiver assemblies.

Such signalling apparatus is commercially available for the reliable transmission of signals. Impressed currents are frequently used instead of impressed voltages since the transmission of current, as opposed to the transmission of voltage, does not lead to error signals in the event of changes in the reference potential (ground) between transmitter and receiver. When several receivers are to be connected to a transmitter, the receivers can be connected in series. This simplifies the supervision of the transmitter and the receivers considerably. This arrangement has the disadvantage, however, that any interruption in the series circuit leads to the failure of all receivers. To avoid this, a separate transmitter can be provided for each receiver. Then, however, increased circuit cost and a correspondingly increased probability of failure must be tolerated. It also becomes substantially more difficult to control all transmitted and received signals so that they register.

It is therefore an object of the present invention to provide a signalling apparatus of the type mentioned at the outset in which the signal transmission is reliable while, at the same time, expenditure for circuitry is low.

SUMMARY OF THE INVENTION

According to the present invention, this problem is solved by providing a series connected circuit of threshold stages at the output terminals of each transmitter, which corresponds in number to the number of receivers, with each receiver input being connected in parallel to a threshold stage. Then, if a receiver or a transmission line is interrupted, the voltage at the threshold stage increases until the threshold stage becomes conducting, short-circuiting the open transmission path. This insures that an interruption in one receiver or transmission line does not lead to failure of all receivers. Since only one transmitter is required for all receivers, supervision of the transmitted signal is simple; and the cost of the circuitry remains low.

In signalling apparatus for transmitting unipolar signals, each threshold stage is advantageously a Zener diode; in apparatus for transmitting bipolar signals, each threshold stage advantageously consists of a series circuit of two bucking Zener diodes. The threshold stages are therefore realized with simple and reliable components. The Zener voltage of each Zener diode must be larger than the maximum input voltage of the receiver with which it is associated, including the voltage drop in the transmission line.

For monitoring the transmitted signals, a control receiver is advantageously connected in series with each series-connected circuit of threshold stages in the transmitter assembly. This monitoring system further increases the reliability of transmission. Since one transmitter feeds all receivers in a series circuit, all transmitted signals are of necessity equal, so that one control receiver is sufficient.

In a signalling apparatus for transmitting binary signals, the output of each control receiver can be connected to a first input of a comparator or exclusive-or-gate stage for signal comparison with the signal to be transmitted which is applied to the second input. In this way, the signal delivered by the transmitter to each receiver is compared with the signal to be transmitted. To indicate trouble, if the transmitted signal deviates from the signal to be transmitted, each comparator stage is advantageously followed by an indicator. Automatic disconnection of erroneously transmitted signals is obtained by connecting the output of each comparator stage to the control input of a switch arranged between the transmitter output and the reference potential of the circuit arrangement.

In signalling apparatus where several transmitters are used for transmitting a combination of binary signals, each control receiver can be followed by a decoder for detecting impermissible signal combinations. In this way, impermissible signal combinations are easily recognized on the transmitter side. In addition, it is possible to detect errors in the transmission path which lead to an impermissible signal combination if the output of each receiver is connected to a decoder for detecting impermissible signal combinations.

The decoder can be followed by a time delay stage. Then in the event of a fault in the transmitter, appearance of the trouble indication in the receiver assembly is delayed. Should the transmitter be disconnected automatically, in the event of trouble in the transmitter, no trouble indication will appear in the receiver assembly, and selectivity of the trouble indication is obtained.

The signalling assembly may comprise a main transmitter and a control transmitter, for each signal to be transmitted, the control transmitter transmitting the inverted signal of the main transmitter. In this case each signal is transmitted redundantly and the inverted transmission makes simple control possible. Less circuitry with little reduction in transmission reliability is obtained when the transmitter assembly has one main transmitter for each signal to be transmitted and a common control transmitter for several signals to be transmitted, the control transmitter transmitting the inverted sum of the signals of the main transmitter.

The mentioned transmission of a non-inverted and an inverted signal makes simple supervision possible when the transmitter assembly is provided with a summing stage for each control transmitter and the inputs the control receivers associated with the control transmitter and the corresponding main transmitters are connected to the stage. It is advantageous to connect the output of the summing stage of the transmitter assembly to a limit stage having an indicating device which provides an indication if the sum of the signals of the control receivers deviates from zero.

Advantageously, also, each receiver assembly may contain a summing stage for each control transmitter, the inputs of the summing stage being connected to the outputs of the receivers associated with the main transmitters and the control transmitter. In this way, errors in the transmission apparatus are detected in a simple manner which a noninverted and an inverted signal is transmitted. For indicating the errors, the output of the receiver assembly summing stage is advantageously followed by a limit stage having an indicating device for signalling deviation of the sum of the corresponding received signals from zero.

In a signalling apparatus in which the sum of the signals of at least two transmitters has a constant value, simple supervision is possible if the transmitter assembly is provided with a summing stage, the inputs of which are connected to the control receivers for the signals with constant sum, and a limit stage with an indicating device follows the output of each summing stage. A fault in the circuit is detected by a deviation of the sum of the signals from their reference value.

Similarly, monitoring on the receiver side is possible in a transmission apparatus in which the sum of the signals of at least two transmitters has a constant value if, in each receiver assembly, a summing stage follows the receivers of the signals with constant sum and the output of each summing stage is connected to a limit stage with an indicating device. Errors in the transmission path can then be detected.

Each limit stage of the receiver assembly can be followed by a time delay stage. In the event of errors in the transmitter, a delayed response of a trouble indication on the receiver side, relative to the trouble indication on the transmitter side, is thereby achieved. If the transmitter is switched off automatically, no trouble indication occurs on the receiver side.

DETAILED DESCRIPTION OF THE INVENTION

Figure 1:
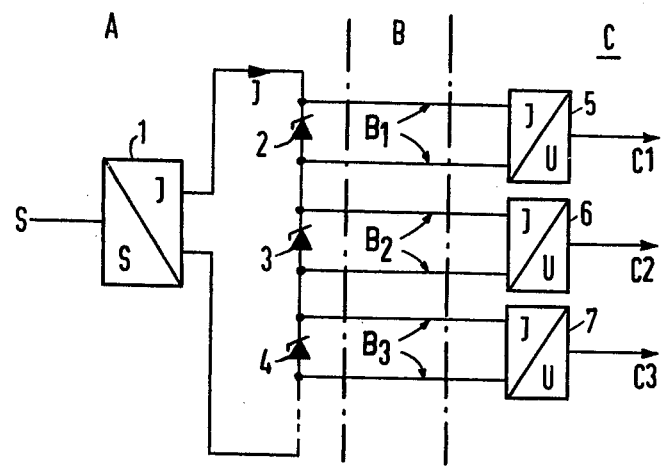
FIG. 1 is a schematic diagram illustrating the basic principle of the invention.

FIG. 1 is a schematic diagram illustrating the basic of the invention. A binary or analog signal to be transmitted is converted in a signal converter or transmitter 1 into a current I to be impressed on the receivers. A series circuit of three threshold stages, Zener diodes 2, 3, 4 in the illustrative embodiment, is connected across the output of transmitter 1. Receivers 5, 6, 7 are each connected via individual transmission lines $B_1$, $B_2$, $B_3$ in transmission line section B.

Each receiver 5, 6, 7 is designed as a signal converter and converts the current signal flowing in its input back into a voltage. The circuit is designed so that the Zener voltage of each Z-diode 2, 3, 4 is larger than the sum of the maximum voltage drop at the associated receiver 5, 6, 7 and the voltage drop on the transmission line. The maximum voltage delivered by transmitter 1 is larger than the maximum countervoltage present at the loop connected to the transmitter output.

As long as there is no interruption in any transmission line in section B or in the input circuit of a receiver 5, 6, 7, the voltage present across the Z-diodes 2, 3, 4 is smaller than the Zener voltage and all Z-diodes 2, 3, 4 are cut off. The current I therefore flows through the series connected inputs of receiver 5, 6, 7. It is then assured that all receivers 5, 6, 7 receive the same signal. As soon as an interruption occurs in the transmission line section B or in the input circuit of a receiver 5, 6, 7, the voltage at the associated Z-diode 2, 3 or 4 increases beyond the Zener voltage, and the respective Z-diode conducts. The interrupted line is thus short-circuited and the other receivers continue to be supplied with current, uninterrupted.

With this circuit it is therefore ensured, with low cost of technical means, that the interruption of one receiver or one transmission line does not lead to failure of the other receivers and that all undisturbed receivers receive the same signal. It goes without saying, also, that more than three receivers can be supplied by providing a correspondingly larger number of Z-diodes in the output loop of transmitter 1.

Figure 2:
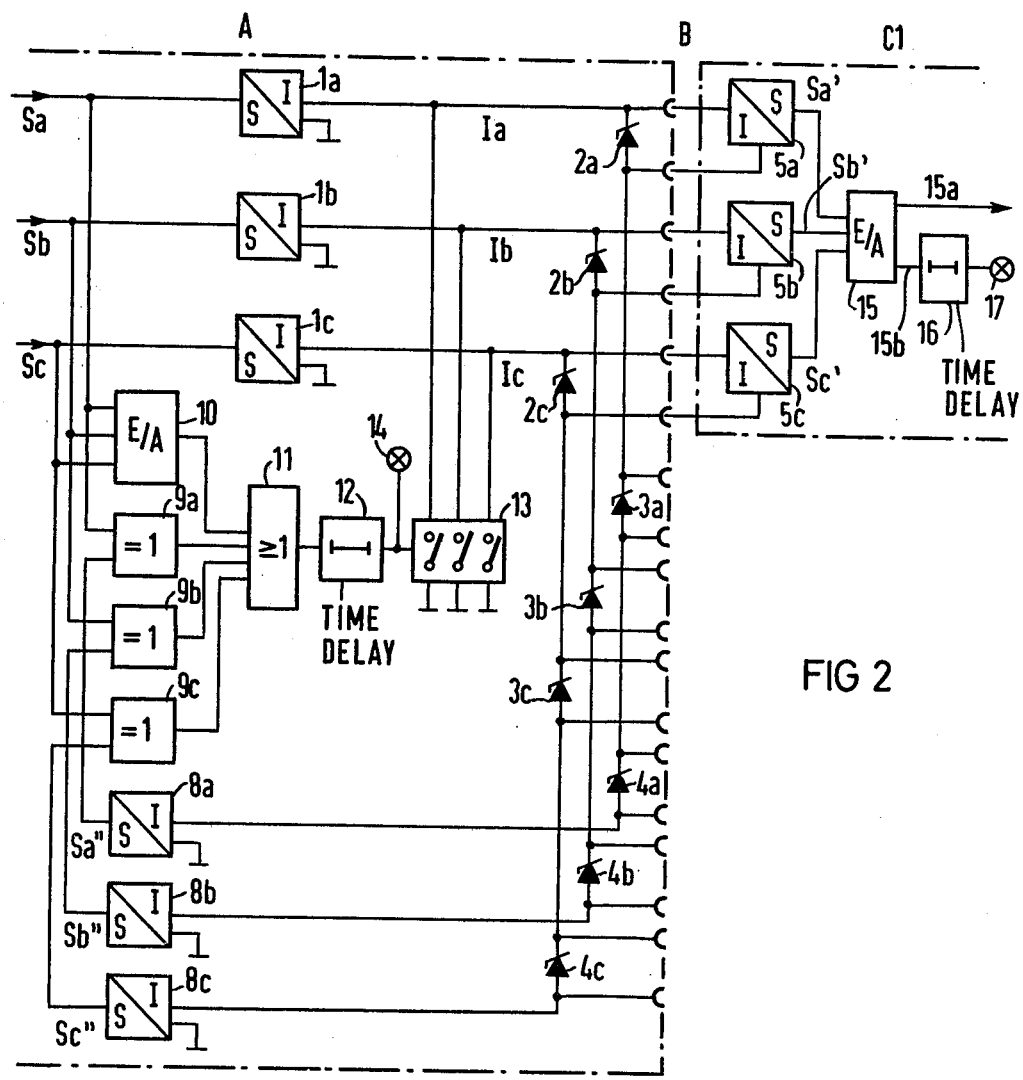
FIG. 2 is a schematic diagram illustrating a signalling apparatus having monitoring devices, in accordance with the teachings of the invention.

FIG. 2 shows a transmission apparatus for binary signals which is provided with additional monitoring devices to further assure the signal transmission. Here, three transmitters $1a$, $1b$, $1c$ are provided in transmitter assembly A for transmitting a 3-bit binary signal $Sa$, $Sb$, $Sc$. The transmitters $1a$, $1b$, $1c$ are designed as signal converters and convert signal voltages $Sa$, $Sb$, $Sc$ into currents $Ia$, $Ib$, $Ic$. The output of each transmitter $1a$, $1b$, $1c$ is connected to a series circuit including, respectively, three Zener diodes $2a$, $3a$, $4a$; $2b$, $3b$, $4b$; $2c$, $3c$, $4c$, and a control receiver $8a$, $8b$, $8c$. Each control receiver $8a$ to $8c$ is designed as a signal converter and converts the current signals $Ia$, $Ib$, $Ic$ into voltage signals $Sa''$, $Sb''$, $Sc''$, respectively. The input voltage signals $Sa''$, $Sb''$, $Sc''$ are also fed to one input each of exclusive-or stages $9a$, $9b$, $9c$. The signals $Sa$, $Sb$, $Sc$ are fed to the second input of exclusive-or stages $9a$ to $9c$. Agreement of the transmitted current signal $Ia$, $Ib$, $Ic$ with the signals $Sa$, $Sb$, $Sc$ is checked in exclusive-or stages $9a$, $9b$, $9c$. Each exclusive-or stage $9a$, $9b$, $9c$ delivers a "1" signal when there is not agreement. Control receivers $8a$, $8b$, $8c$ are arranged at the end of each series circuit nearest ground potential, so that a short circuit to ground potential in the series circuit causes the control receivers to no longer receive current, and the antivalence stages therefore determine a departure of the current signal $Ia$, $Ib$, $Ic$ from the input signal $Sa$, $Sb$, $Sc$, respectively. The signals $Sa$, $Sb$, $Sc$ are also fed to a decoder 10 which delivers a "1" signal at the output in the event of an impermissible signal combination such as can occur in redundant signal codes. The output signals of decoder 10 and of antivalence stages $9a$, $9b$, $9c$ are fed to the inputs of an OR-gate 11. The output of OR-gate 11 is fed to and controls a 3-pole switch 13, via a time delay stage 12. The latter is provided to avoid erroneous fault indications which could be caused by propagation differences in the transmission paths. When switch 13 is closed, the outputs of transmitters $1a$, $1b$, $1c$ are shorted. In this way, delivery of a signal from transmitter assembly A is prevented in the event that decoder 10 or antivalence stages $9a$, $9b$, $9c$ respond; i.e., if an unpermissible signal combination occurs, in the event of a fault in the transmitter, or in the event of an interruption or short circuit in the transmission circuit. The output of the delay stage 12 is coupled to an indicator 14 which indicates such a fault.

It will be understood that each Zener diode $2a$, $2b$, $2c$, $3a$, $3b$, $3c$, $4a$, $4b$, $4c$ is shunted by a receiver; for the sake of clarity only one receiver assembly C1 having associated receivers $5a$, $5b$, $5c$ for the signals $Sa$, $Sb$, $Sc$ is shown in FIG. 2. Each receiver $5a$, $5b$, $5C$ is designed as a signal converter for converting the current signals $Ia$, $Ib$, $Ic$ into voltage signals $Sa'$, $Sb'$, $Sc'$. Each receiver's current input is potential-isolated in order to preclude signal falsification when the ground potentials of receiver assembly C1 and transmitter assembly A are different. Receivers $5a$, $5b$, $5c$ are followed by a decoder 15 which has an output $15a$ for evaluation of the signal and an output 15b for indicating impermissible signal combinations. Output 15b is connected to an indicator 17 via a delay stage 16.

The delay time $t_E$ of time delay stage 16 in receiver assembly C is made longer than the delay time $t_S$ of each stage 12 in transmitter assembly A. Then, when a fault occurs in transmitter assembly A and is recognized by antivalence stages 9a, 9b, 9c or decoder 10, transmitters 1a, 1b, 1c are switched off at the end of the delay time $t_S$ and indicating device 14 delivers a fault signal. Since an impermissible signal combination is present at receivers 5a, 5b, 5c only for the time $t_S$ and the delay time $t_E$ of delay device 16 on the receiver side is longer than $t_S$, receiver assembly C will not deliver a fault signal in the event of a disturbance on the transmitter side. In the event of a disturbance on the receiver side, however, only receiver assembly C delivers a fault signal. The fault signals therefore selectively indicate the disturbed part of the system.

Reliable binary signal transmission is thus possible with the transmission apparatus described above, since the failure of a transmission line or a receiver does not result in the failure of other receivers. On the transmitter side, a simple and functionally reliable comparison of the signals to be transmitted with the actually transmitted signals is provided. The agreement of the transmitter signals among each other is ensured already by the circuit arrangement. The transmitters as well as the receivers contain a reasonableness control in the form of a decoder for recognizing impermissible signal combinations.

Figure 3:
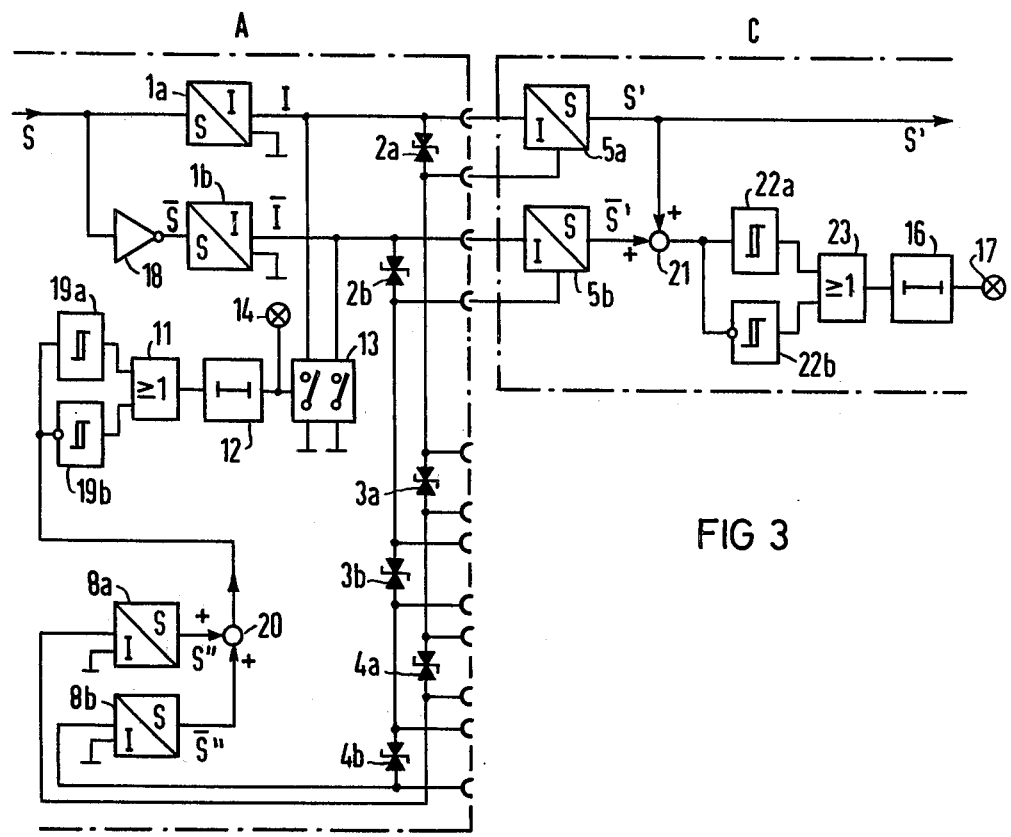
FIG. 3 is a schematic diagram of a signalling apparatus for use with bipolar analog signals.

FIG. 3 shows the invention in a form useful for bipolar analog signals. Here, an analog signal S is converted by a signal converter 1a, the first transmitter, into a signal current I. At the same time, the signal S is inverted in an inverter 18 and converted in a signal converter 1b, the second transmitter, into a signal current $\bar{I}$. Shunted across the output terminals of each transmitter 1a and 1b is a series circuit comprising threshold members 2a, 3a, 4a, and 2b, 3b, 4b and signal converters 8a and 8b (each as a control receiver), respectively. Because of the bipolar signals, threshold members 2a, 3a, 4a and 2b, 3b, 4b each consist of two bucking Zener diodes; there is, therefore, a threshold voltage in both directions of current flow. The same design considerations for the Zener voltages, explained above in connection with FIG. 1, apply here. The output signals S" of control receiver 8a and $\bar{S}''$ of control receiver 8b are added in a summing stage 20. Since the signal $\bar{S}$ was obtained by inversion of the signal S, the sum of S" and $\bar{S}''$ must be zero when the transmission is without error. To monitor this condition, the output of summing stage 20 is connected to the input of each parallelconnected limit indicator 19a and 19b, the input to indicator 19b being inverted. Limit indicator 19a detects positive deviations of the sum from zero and limit indicator 19b detects negative deviations because of the inversion provided in its input. When the sum of the signals S" and $\bar{S}''$ deviates from zero by a predetermined amount, either limit indicator 19a or limit indicator 19b responds, closing the switch 13 via an OR-gate 11 and a time delay stage 12. Switch 13 has two make contacts which short the output signals of transmitters 1a and 1b to ground when the switch 13 is activated. In the event of an error in a loop of transmitter 1a or of 1b, both signals I and $\bar{I}$ therefore become zero. Time delay stage 12 is followed by an indicator 14 which indicates this error.

The addtional transmission of the inverted signal $\bar{S}$ and the addition of the monitoring device therefore make it possible to detect faulty transmitters and interruptions or short circuits in the transmitter loops.

As before, a receiver is connected parallel to each threshold member 2a, 3a, 4a and 2b, 3b, 4b; for the sake of clarity, only the associated receivers 5a and 5b are shown in FIG. 3. Receivers 5a and 5b are designed, as in the already described examples, as potential isolated signal converters which convert the current signal $\bar{I}$ and I into voltage signals S' and $\bar{S}'$. The signal S' directly represents the desired received signal; the signal $\bar{S}'$ is used as a control signal and is added to the signal S' in a summing stage 21. If the transmission is error-free, the sum of the signals S' and $\bar{S}'$ is also zero. This condition is monitored in the same way as in transmitter assembly A by means of two limit stages 22a and 22b, with limit stage 22a detecting deviations in the positive direction and limit stage 22b detecting deviations in the negative direction. If one of the two limit stages responds, an indicating device 17, which indicates this type of error, is activated via an OR-gate 23 and a time delay stage 16. The time delay $t_E$ of time delay stage 16 on the receiver side is longer than the time delay $t_S$ of time delay stage 12 on the transmitter side, so that selectivity of the faulty indication is again achieved in the way that it was in the circuit of FIG. 2. For the transmission of several analog signals it is not necessary that each individual analog signal be transmitted inverted; instead it is generally sufficient to transmit the inverted sum of all signals in addition to the analog signals. The monitoring is then accomplished as in the circuit of FIG. 3 by adding the inverted and the noninverted sum which must likewise furnish the result zero when there are no faults in the circuit. Practically any deviation of a transmitted signal from the intended value also leads to a deviation of the signal sum from the intended value.

If the signals to be transmitted always have a constant sum, a particularly simple monitoring becomes possible if the signal sums are monitored in the transmitter and in the receivers by means of a limit indicator. This method is suggested, for instance in three-phase networks where the sum of all voltages and currents must always be zero.

With the described transmission apparatus it is therefore also possible to transmit analog signals secure against interference. By means of the described monitoring devices, almost all faults in the transmitters, in the receivers, and on the transmission lines are detected.

Figure 4:
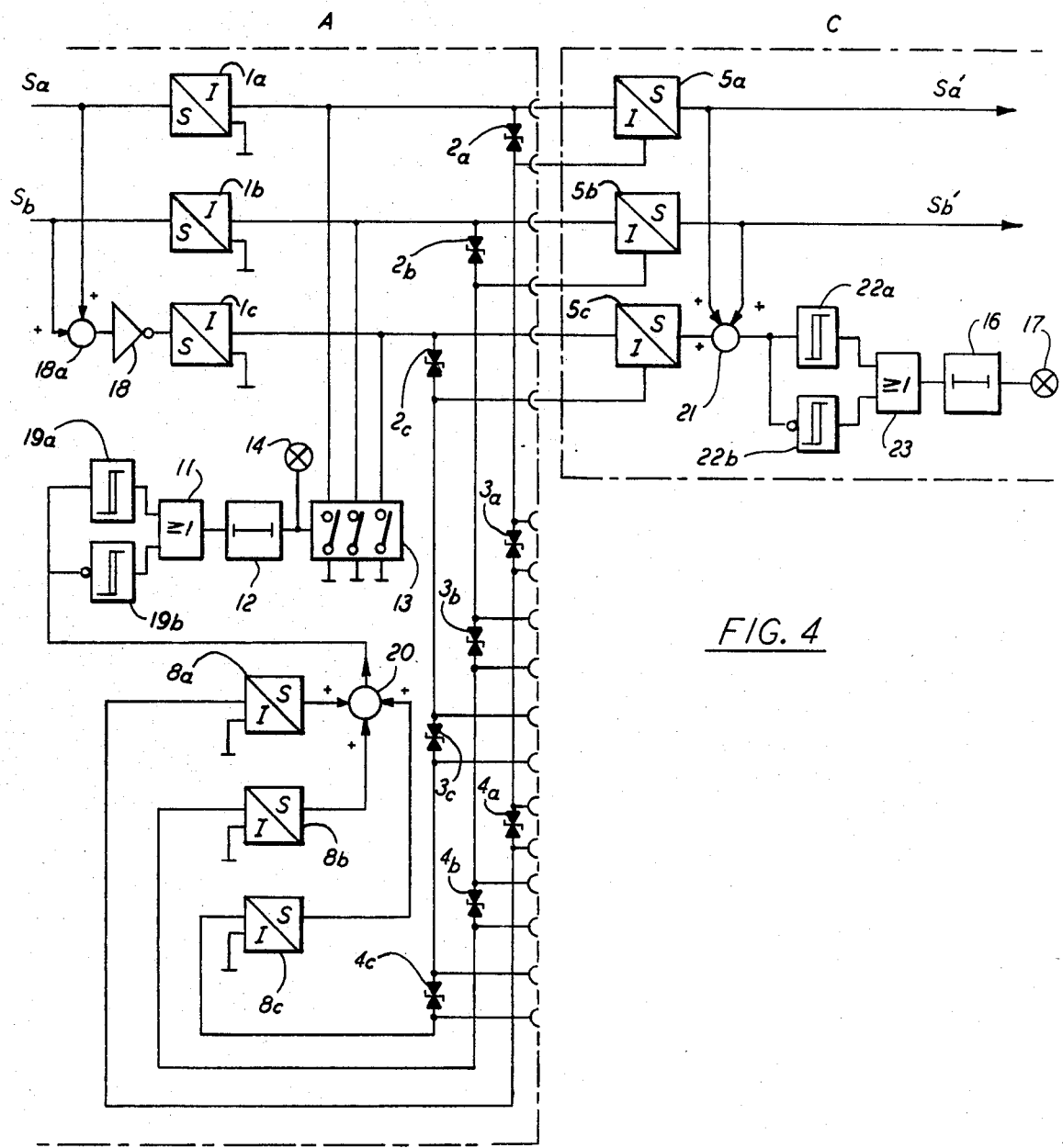

FIG. 4 illustrates the combination of several analog signals without inversion as called for above. In this case, two input signals 5a and 5b are combined at summing junction 18a prior to inversion in inversion stage 18 and transmission via control transmitter 1c (in the manner shown in FIG. 3). Each input signal has its own main transmitter 1a and 1b, and the outputs of each transmitter are fed to separate circuits of series-connected threshold elements, and, via three transmission lines, to each receiver assembly C in the manner already described. Now, instead of two control receivers in the transmitter and two receivers in the receiver assembly, three receivers 8a, 8b and 8c and 5a, 5b and 5c, respectively, are provided, with their outputs combined in summing junctions 20 and 21, respectively, in the same manner as shown in FIG. 3.

What is claimed is:

1. A signalling apparatus for reliable communication between a transmitter and a plurality of receivers at locations which are distant from that of the transmitter, the signalling apparatus comprising:

a main transmitter having an input for a signal to be transmitted and having an output;

a plurality of receivers, each located at a distance from the transmitter, each receiver having an input;

a series circuit of threshold members connected across the output of the main transmitter at the location of the transmitter, there being a threshold member for each receiver;

a plurality of transmission lines, each transmission line having an input connected across one of the threshold members and an output connected to the input of a receiver;

each threshold member including at least one Zener diode having a threshold voltage which is greater than the sum of the voltage drop across the input to the transmission line and the voltage drop across the input to the receiver when a signal is being received by the receiver; and a control receiver having an input connected in series with the series circuit of threshold members to provide an output signal when a signal is transmitted to the receiver assembly.

2. A signalling apparatus in accordance with claim 1 for transmitting unipolar signals, in which:

each threshold member comprises a Zener diode.

3. A signalling apparatus in accordance with claim 1 for transmitting bipolar signals, in which:

each threshold member comprises a series circuit of two bucking Zener diodes.

4. A signalling system for transmitting a plurality of signals comprising a signalling apparatus in accordance with claim 3 for each signal to be transmitted and further comprising:

means having each signal to be transmitted as an input and having the inverted sum of the input signals as an output;

a control transmitter having the inverted sum of the input signals as an input and having an output;

a second plurality of receivers, each receiver having an input;

a second plurality of threshold members series-connected across the output of the control transmitter;

and a second plurality of transmission lines, each transmission line having an input connected across one of the threshold members in the second plurality of threshold members and an output connected to the input of a receiver in the second plurality of receivers, each threshold member having a threshold volage which is greater than the sum of the voltage drops across the input to the transmission line and the input to the receiver where a signal is being received.

5. A signalling system having at least two signalling apparatus in accordance with claim 1 for transmitting binary signals, and further comprising:

a comparison stage having one input coupled to the output of the control receiver and a second input coupled to the input of the transmitter for generating a comparison signal.

6. A signalling system in accordance with claim 5, and further comprising:

a switch having a control input to which the output of the comparison stage is coupled, the switch being adapted to connect the transmitter output to reference potential.

7. A signalling system in accordance with claim 5, and further comprising:

an indicator stage coupled to the output of the comparison stage and responsive to the comparison signal therefrom.

8. A signalling system in accordance with claim 7, and further comprising:

a switch having a control input to which the output of the comparison stage is coupled, the switch being adapted to connect each transmitter output to reference potential.

9. A signalling system in accordance with claim 5 wherein the sum of the input signals to the transmitters has a constant value, the further comprising:

a summing stage in the transmitter assembly having inputs to which the outputs of the control receivers are fed; and a limit stage having an input coupled to the output of the summing stage and having an output coupled to an indicating device.

10. The signalling apparatus of claim 9, and further comprising:

a time delay stage coupled between the limit stage and the indicating device.

11. A signalling apparatus for transmitting a binary signal combination, the apparatus comprising, for each bit in the binary signal combination, a transmitter, a series circuit of threshold members, and plural receivers, each receiver connected by a transmission line to a threshold member, all in accordance with claim 1, and further comprising:

a decoder having inputs coupled to the output of each transmitter for detecting impermissible signal combinations and providing an output signal.

12. A signalling apparatus in accordance with claim 11, and further comprising:

a delay stage coupled to the output of the decoder.

13. A signalling apparatus for transmitting a binary signal combination, the apparatus comprising, for each bit in the signal combination, a transmitter, a series circuit of threshold members, a plurality of receivers, each receiver connected by a transmission line to a threshold member, and a control receiver, all in accordance with claim 1, and further comprising:

a comparison stage for each bit in the signal combination, each stage having a first input coupled to the output of one control receiver and a second input coupled to the input of the respective transmitter, and each stage having an output;

a decoder having inputs coupled to the inputs of the respective transmitters, the decoder generating an output signal when impermissible signal combinations occur; and an OR gate having the outputs of the comparison stages and the output of the decoder as inputs, and having a fault signal as an output.

14. A signalling apparatus in accordance with claim 13, and further comprising:

a delay stage coupled to the output of the OR gate.

15. A signalling apparatus in accordance with claim 1 and further comprising:

an inverter coupled to the input of the transmitter and having an output providing the signal to be transmitted in inverted form;

a control transmitter having an input coupled to the output of the inverter;

a second plurality of receivers, each receiver having an input;

a second plurality of threshold members connected in a second series circuit across the output of the control transmitter, the number of threshold members corresponding to the number of receivers in the second plurality of receivers; and a second plurality of transmission lines, each transmission line having an input connected across one of the threshold members of the second series circuit and having an output connected to the input of a receiver in the second plurality of receivers, each threshold member having a threshold voltage which is greater than the sum of the voltage drops across the input to the transmission line and to the receiver where a signal is being received by the receiver.

16. A signalling apparatus in accordance with claim 15 and further comprising:

a first control receiver having an input connected in series with the series circuit of threshold members of the main transmitter to provide an output when the signal to be transmitted is transmitted; and a second control receiver having an input connected in series with the second series circuit of threshold members to provide an output when the inverted form of the signal to be transmitted is transmitted.

17. A signalling apparatus in accordance with claim 15, in which a receiver from each plurality of receivers together comprise a receiver assembly, and further comprising:

a summing stage in the receiver assembly, the outputs of the receiver associated with the main transmitter and of the receiver associated with the control transmitter being coupled as inputs to the summing stage.

18. A signalling apparatus in accordance with claim 17, further comprising:

a limit stage coupled to the output of the summing stage of the receiver assembly, the output of the limit stage being coupled to at least one indicating device.

19. A signalling apparatus in accordance with claim 18, and further comprising:

a time delay stage having an input coupled to the output of the limit stage and having an output coupled to the indicating device.

20. A signalling system for transmitting plural signals comprising a signalling apparatus in accordance with claim 1 for each signal to be transmitted and further comprising:

an inverter for each signal to be transmitted, each inverter having an input coupled to the input of each main transmitter, and having an output;

a control transmitter for each inverter having the output of the inverter as an input and having an output;

a control receiver for each main transmitter, the control receiver having an output;

a control receiver for each control transmitter, the control receiver having an output; and a summing stage for each main transmitter and its associated control transmitter, the summing stage having the output of the control receivers for associated main and control transmitters as inputs.

21. In a signalling apparatus in accordance with claim 20, the improvement comprising:

the output of the summing stage being coupled to a limit stage having an indicating device.

22. A signalling apparatus in accordance with claim 1 and further comprising:

a control transmitter having an input and an output;

an inverter having the signal to be transmitted as an input and coupling it, in inverted form, to the input of the control transmitter;

a second control receiver having an input connected in series with the output of the control transmitter; and a summing stage having the outputs of the control receivers as inputs for detecting when transmission is error free.

23. In a signalling apparatus in accordance with claim 22, the further improvement comprising:

the output of the summing stage being coupled to a limit stage having an indicating device.

24. A signalling system for transmitting a plurality of signals comprising a signalling apparatus in accordance with claim 1 for each signal to be transmitted and further comprising:

means having each signal to be transmitted as an input and having the inverted sum of the input signals as an output;

a control transmitter having the inverted sum of the input signals as an input and having an output;

a second plurality of receivers, each receiver having an input;

a second plurality of threshold members series-connected across the output of the control transmitter;

and a second plurality of transmission lines, each transmission line having an input connected across one of the threshold members in the second plurality of threshold members and an output connected to the input of a receiver in the second plurality of receivers, each threshold member having a threshold voltage which is greater than the sum of the voltage drops across the input to the transmission line and the input to the receiver where a signal is being received.

25. A signalling apparatus in accordance with claim 24 and further comprising:

a first control receiver having an input connected in series with the series circuit of threshold members connected across the output of the main transmitter to provide an output when the signal to be transmitted is transmitted to the receiver; and a second control receiver having an input connected in series with the second series circuit of threshold members to provide an output when the inverted sum of the input signals are transmitted.

26. A signalling apparatus in accordance with claim 24, in which a receiver from each plurality of receivers together comprise a receiver assembly, and further comprising:

a summing stage in the receiver assembly, the outputs of the receiver associated with the main transmitter and of the receiver associated with the control transmitter being coupled as inputs to the summing stage.

27. A signalling system in accordance with claim 26, and further comprising:

a limit stage coupled to the output of the summing stage of the receiver assembly, the output of the limit stage being coupled to an indicating device.

28. A signalling system in accordance with claim 27, and further comprising:
a time delay stage having an input coupled to the output of the limit stage and having an output coupled to the indicating device.

29. A signalling device for transmitting a binary signal combination, the apparatus comprising, for each bit in the binary signal combination, a transmitter, a series circuit of threshold members, and plural receivers, each receiver connected by a transmission line to a threshold member, all in accordance with claim 27, and further comprising:
a decoder having inputs coupled to the output of each receiver for detecting impermissible signal combinations and providing an output signal.

30. A signalling apparatus in accordance with claim 29 and further comprising:
an indicator unit; and a time delay unit coupling the output signal of the decoder to the indicator unit.

* * * * *